(12) United States Patent
James et al.

(10) Patent No.: US 10,352,240 B2
(45) Date of Patent: Jul. 16, 2019

(54) GAS TURBINE AND METHOD FOR OPERATING A GAS TURBINE

(75) Inventors: Richard James, Market Rasen (GB); Philip Twell, Lincoln (GB)

(73) Assignee: SIEMENS AKTIENGESELLSCHAFT, München (DE)

( * ) Notice: Subject to any disclaimer, the term of this patent is extended or adjusted under 35 U.S.C. 154(b) by 1073 days.

(21) Appl. No.: 13/824,622

(22) PCT Filed: Aug. 19, 2011

(86) PCT No.: PCT/EP2011/064308
§ 371 (c)(1),
(2), (4) Date: Oct. 31, 2013

(87) PCT Pub. No.: WO2012/038165
PCT Pub. Date: Mar. 29, 2012

(65) Prior Publication Data
US 2014/0050559 A1    Feb. 20, 2014

(30) Foreign Application Priority Data
Sep. 20, 2010 (EP) .................... 10177625

(51) Int. Cl.
*F02C 7/06* (2006.01)
*F01D 11/06* (2006.01)
(Continued)

(52) U.S. Cl.
CPC ............... *F02C 7/06* (2013.01); *F01D 11/06* (2013.01); *F01D 11/08* (2013.01); *F01D 25/166* (2013.01)

(58) Field of Classification Search
CPC .. F02C 7/06; F01D 11/02; F01D 11/04; F01D 11/06; F01D 11/08; F01D 11/10;
(Continued)

(56) References Cited

U.S. PATENT DOCUMENTS 4,156,342 A * 5/1979 Korta ..................... F01D 25/08
184/104.3
4,433,539 A    2/1984 Picard
(Continued)

FOREIGN PATENT DOCUMENTS

CN    1427140 A    7/2003
EP    0532303 A1    3/1993
(Continued)

*Primary Examiner* — Justin D Seabe
*Assistant Examiner* — Alexander A White

(57) ABSTRACT

A gas turbine is provided including a rotor which includes a rotor portion of a fluid bearing for rotatably supporting the rotor, a radially outer stator portion, a radially inner stator portion including a stator portion of the fluid bearing, a compressor air passage extending between the radially outer stator portion and the radially inner stator portion, and an annular gap between the rotor and the radially inner stator portion partially forming an annular air passage in communication with the compressor air passage, wherein along a flow direction of air flowing within the annular air passage a radius of the air passage decreases in a first portion and then increases in a second portion. Further a method for operating a gas turbine is described.

11 Claims, 2 Drawing Sheets

(51) Int. Cl.
*F01D 25/16* (2006.01)
*F01D 11/08* (2006.01)

(58) Field of Classification Search
CPC ...... F01D 11/12; F01D 11/122; F01D 25/125;
F01D 25/166; F01D 25/183; F01D 25/22;
F05D 2240/63; F05D 2260/6022
See application file for complete search history.

(56) References Cited

U.S. PATENT DOCUMENTS

| | | | |
|---|---|---|---|
| 4,441,311 A | | 4/1984 | Robinson, Jr. |
| 4,653,267 A | | 3/1987 | Laurello |
| 4,993,917 A | | 2/1991 | Kulle |
| 5,704,760 A | | 1/1998 | Bouchard |
| 6,923,005 B2 | * | 8/2005 | Casoni ............... F01D 5/08 415/115 |
| 2003/0131602 A1 | * | 7/2003 | Ingistov ............. F01D 11/001 60/772 |
| 2005/0058533 A1 | | 3/2005 | Belokon |
| 2007/0107438 A1 | | 5/2007 | Akagi |
| 2007/0180830 A1 | | 8/2007 | Zentgraf |

FOREIGN PATENT DOCUMENTS

| | | |
|---|---|---|
| EP | 2053201 A2 | 4/2009 |
| FR | 2698406 A1 | 5/1994 |
| JP | 2005023812 A | 1/2005 |
| RU | 2298654 C1 | 5/2007 |
| WO | WO 0201046 A1 | 1/2002 |
| WO | WO 0248525 A2 | 6/2002 |

* cited by examiner

GAS TURBINE AND METHOD FOR OPERATING A GAS TURBINE

CROSS REFERENCE TO RELATED APPLICATIONS

This application is the US National Stage of International Application No. PCT/EP2011/064308, filed Aug. 19, 2011 and claims the benefit thereof. The International Application claims the benefits of European Patent Office application No. 10177625.0 EP filed Sep. 20, 2010. All of the applications are incorporated by reference herein in their entirety.

FIELD OF INVENTION

The present invention relates to a gas turbine and to a method for operating a gas turbine. In particular, the present invention relates to a gas turbine and to a method for operating a gas turbine, wherein an annular gap is formed between a rotor and a stator portion which is designed such that a loss of compressed air guided within the annular gap is reduced.

ART BACKGROUND

A gas turbine is known to comprise a rotor or turbine shaft rotatably supported by a bearing, a compressor portion including rotor blades mounted at the rotor to compress air, a combustor for burning a mixture of fuel and the compressed air, and a turbine portion which converts the energy contained in the burned mixture of fuel and compressed air into mechanical energy to drive the rotor. A gas turbine may for example be used to generate electric energy by driving a generator using the mechanical energy.

In particular, the air compressed by the compressor portion of the gas turbine may flow not only in a compressor air passage leading to the combustor, but also in a gap between the rotor and a stator portion of the gas turbine. Such leakage of compressed air is not desired, because it reduces the amount of compressed air being led to the combustor. Therefore, the gap between the rotor and the stator portion of the gas turbine into which a portion of the compressed air is introduced in an undesired way is sealed to reduce the amount of compressed air introduced into the gap. However, it has been observed that the sealing property of the conventional seals is not satisfactory. An excessive amount of compressed air may leak from the compressor air passage into the gap between the rotor and the stator portion of the gas turbine. Thereby, an efficiency of the gas turbine is reduced.

U.S. Pat. No. 4,993,917 discloses a gas compressor having dry gas seals, wherein a primary dry gas seal adjacent to the discharge end of the compressor is of larger diameter than the corresponding sealing at the inlet end of the compressor so that pressurized gas acting on the respective rotary part of the dry gas seals urges the shaft towards the discharge end of the compressor and thus counteracts dynamic forces on the impeller.

EP 2 053 201 A2 discloses a hydrostatic seal assembly and the corresponding compressor assembly and gas turbine engine, wherein a portion of the primary gas flow is fed through an inner diameter bleed downstream of a blade into a high pressure cavity, which is located radially inward of a vane.

EP 0 532 303 A1 discloses a system and a method for improved engine cooling, wherein cooling air for the support structure within a cavity is obtained by leakage from the compressor discharge air through a labyrinth seal, wherein the portion of the compressor discharge air, which is not directed to the combustor, is throttled through a series of annular restrictions formed radially by a series of rotating labyrinth teeth.

US 2003/0131602 A1 discloses a turbine power plant having an axially loaded floating brush seal, wherein a chamber within a barrel member is supplied with cooling air from the last stage of a compressor by a controlled amount of leakage through labyrinth seal.

WO 02/01046 A1 discloses a sealing system for a gas turbine, wherein air is fed into the inner barrel using the venting piping of the support cushion such as to create a flow of air, which starts from an intermediate stage of the compressor and goes towards the inner barrel.

WO 02/48525 A2 discloses a system to feed cooling air to a gas turbine, wherein the cooling air is taken from a high pressure source and is conveyed to radial accelerators, which give rise to the tangential acceleration of the air in the direction of the peripheral motion of the rotor surface. The cooling air is released into the hollow rotor with a correspondingly reduced outlet radius.

US 2005/0058533 A1 discloses a sealing arrangement for a compressor, that includes a pressurized air supply duct for supplying pressurized air into a leakage pathway defined between a compressor wheel and a housing of the compressor, which leakage pathway leads from the main gas flow path into a bearing area of the compressor, the pressurized air being supplied at a pressure sufficient to ensure that air and gaseous fuel cannot flow from the main gas flow path through the leakage pathway into the bearing area.

There may be a need for a gas turbine providing higher efficiency, in particular providing a higher sealing capacity of compressed air leaking from the compressor air passage. Further, there may be a need for a method for operating a gas turbine such as to improve the efficiency of the gas turbine, in particular to more effectively seal a gap between the rotor and the stator portion of the gas turbine.

SUMMARY OF THE INVENTION

According to an embodiment a gas turbine is provided, which comprises a rotor comprising a rotor portion (a portion which is associated with the rotor or which is housed in the rotor) of a fluid bearing (in particular an oil bearing) for rotatably supporting the rotor (thus holding the rotor such that it can rotate, in particular around an axial rotation axis); a radially outer stator portion (the radially outer stator portion being radially located farther out (farther away from the rotation axis) than the radially inner stator portion, wherein a radial direction may be perpendicular to the axial direction around which the rotor rotates); a radially inner stator portion (being radially located farther inwards (closes to the rotation axis) than the radially outer stator portion) comprising (or housing or defining) a stator portion of the fluid bearing (the stator portion being associated with the stator part of the gas turbine, the rotor rotating relative to the stator portion of the gas turbine), a compressor air passage (for guiding compressed air from a compressor portion of the gas turbine to a combustor farther downstream) extending between the radially outer stator portion and the radially inner stator portion (in particular, the compressor air passage may be an annular compressor air passage extending in a circumferential direction perpendicular to the axial direction and perpendicular to the radial direction); and an annular gap (or a clearance or a distance defining a space void of solid material) between the rotor and the radially inner stator portion (the annular gap may comprise a portion filled or at least partially filled or covered with a bearing fluid, such as oil, associated with the fluid bearing) partially forming an annular air passage in communication with the compressor air passage (in particular, the annular gap may branch off the compressor air passage resulting in compressed air leaking from the compressor air passage and being introduced into at least the annular air passage of the annular gap), wherein along a flow direction (a direction of flow of the air) of air flowing within the annular air passage a radius (or a diameter or an area) of the air passage decreases in a first portion (in particular being further upstream than the second portion) and then increases in a second portion (in particular being further downstream than the first portion, wherein in particular the air flowing within the annular air passage first reaches the first portion and then reaches the second portion, in particular). Further, the gas turbine comprises a discharge conduit for discharging the air flown through the second portion of the annular air passage, wherein an inlet of the discharge conduit for introducing the air flown through the second portion of the annular air passage is axially arranged between the second portion of the annular air passage and the fluid bearing.

The discharge conduit (or conduit system) is provided for discharging the air flown through the second portion of the annular air passage. In particular, the discharge conduit may vent to atmosphere. In particular, the discharge conduit may be arranged downstream of the seal arranged within the annular air passage. In particular, the discharge conduit may comprise one or more tubes, pipes and/or valves to control an amount of air discharging through the discharge conduit. Thereby, residual air flowing through the seal may be effectively vented or discharged. Thereby, introduction of this residual air into the fluid bearing, in particular a bearing chamber of the fluid bearing, may be reduced or even avoided.

The discharge conduit system for discharging a portion of the supplied air may comprise a number of discharge pipes arranged at different axial positions and/or at different circumferential positions of the turbine. The discharge pipe system may discharge excess air supplied towards the fluid bearing and in particular air that is too hot; this is to prevent additional temperature related degradation of the bearing fluid, in particular the oil. The discharge pipe system may lead to atmosphere and/or to an exhaust passage of the turbine.

Since the discharge conduit for introducing the air flown through the second portion of the annular air passage is axially arranged between the second portion of the annular air passage and the fluid bearing, introduction of air flowing within the annular air passage or flowing within the annular gap into the bearing chamber may be reduced or even be avoided.

Since the annular gap is in communication with the compressor air passage compressed air bled from the compressor portion of the gas turbine may enter into the annular gap and may thus be supplied towards the fluid bearing chamber of the fluid bearing. Thereby, fluid contained within the fluid bearing chamber may be effectively prevented from entering the annular gap or at least be prevented from entering the turbine compressor air passage which would adversely affect the operation of the turbine.

In particular, at the annular gap a seal may be provided for sealing or reducing compressed air from the compressor air passage to be introduced into the annular gap. In particular, the seal may be arranged at a position at the annular gap, where the annular gap has a sufficiently small radius or where the annular gap has a lowest radius. Providing the seal at a position of a lowest radius of the annular gap has the advantage that the sealing function may be improved, since a smaller area must be sealed than when the seal would be arranged at a position having a larger radius or diameter. Thereby, an amount of compressed air introduced into the annular gap or into the annular air passage may be reduced for improving the efficiency of the gas turbine. Thereby, leakage of compressed air from the compressor air passage may be reduced.

The seal may be the more efficient the smaller the area of the seal is. In particular, the area of the seal may be defined as a circular ring slice, wherein the width (in a radial direction) of the ring is given by a difference of the radius of the radially inner stator portion and the radius of the rotor at the particular axial position delimiting the annular air passage of the annular gap.

The gas turbine may comprise a single rotor or two rotors which are separate from each other. Supported by the fluid bearing the rotor is able to rotate about a rotation axis running along an axial direction. The fluid bearing may comprise any gaseous fluid or liquid fluid, in particular oil. The fluid may be supplied under pressure for example by pumping fluid, in particular oil, into a bearing chamber of the fluid bearing. Thereby, a thin layer of fluid may fill a clearance between a bearing face of the rotor, also called journal of the rotor or of the shaft, and a bearing face of a stator part of the turbine within a bearing chamber of the fluid bearing. The fluid may continuously be pumped into the bearing chamber to maintain the thin layer of fluid in between the bearing faces rotating relative to each other.

According to an embodiment the turbine further comprises a turbine compressor comprising plural rotor blades fixed at the rotor at different axial positions, wherein the control system is adapted to supply air taken from an intermediate axial position of the turbine compressor to the air supply pipe system. The annular gap may also be denoted as an annular clearance delimited by a rotor face on one side and by a stator face on the other side. The rotor face as well as the stator face may have an irregular shape and may in particular not have plane or cylindrical shape, but may have a stepped shape, thus having different diameters at different axial positions.

According to an embodiment a decrease of the radius of the air passage in the first portion of the air passage is greater than an increase of the radius of the air passage in the second portion of the air passage. In particular, the compressor air passage is located radially farther outwards than the annular air passage. In particular, the annular gap branches off the compressor air passage radially inwards. In particular, the rotor portion of the fluid bearing is located radially more inwards than the compressor air passage.

According to an embodiment a smallest radius of the air passage ranges between 0.1 and 0.5 of a largest radius of the air passage. The lower the smallest radius of the air passage the more efficient the air introduced from the compressor air passage may be sealed from flowing within the annular air passage or flowing within the annular gap, in particular avoiding the flow within the annular gap towards the fluid bearing. Thereby, an efficiency of the seal (in particular located at least in the portion of smallest radius of the annular air passage) may be improved, thus improving the efficiency of the gas turbine. In particular, less compressed air guided within the compressor air passage leaks into the annular gap.

According to an embodiment the annular air passage comprises a seal for sealing air branched off the compressor air passage not to flow (or at least reduce a flow) within the annular gap towards the fluid bearing. In particular, the seal may comprise plural labyrinth seals. In particular, the seal (in particular including plural labyrinth seals) may be arranged at least in the second portion of the annular air passage. In particular, the seal may be arranged at least at an axial position of the annular air passage or of the annular gap having a smallest radius. By arranging the seal at the position of smallest radius an efficiency and a sealing property of the seal may be improved, reducing leakage of compressed air leaking off the compressor air passage.

According to an embodiment the discharge conduit system is in communication with the annular gap. Thereby, it is enabled that excess air being supplied towards the fluid bearing via the annular gap or at least partially flowing within the annular gap may be discharged via the discharge pipe system. Discharge of excess air may in particular be necessary during normal running conditions of the turbine. In contrast, during hot shut-down, the control system may shut off the discharge pipe system or at least reduce a flow rate of air discharging through the discharge pipe system, in order to reduce the demand of air generated by an external air source, such as an external compressor which may be required to be activated in particular during hot shut-down.

The discharge conduit system may be in communication with the annular gap downstream of the compressor exit and upstream of the fluid bearing. Additionally or alternatively the discharge pipe system may be in communication with the annular gap downstream of the fluid bearing. Communication of the discharge pipe system with the annular gap may be achieved by providing one or more discharge pipes at different axial positions and/or different circumferential positions.

According to an embodiment the turbine further comprises an air supply conduit system for supplying air towards the annular gap. Thereby, the air supplied by the air supply conduit system may function as a buffer air for buffering communication of fluid in the bearing chamber and residual air flowing within the annular gap or annular air passage. In particular, a portion of the air introduced by the air supply conduit system may flow towards the bearing chamber and another portion thereof may flow in an opposite direction towards the inlet of the discharge conduit and/or towards the second portion of the annular air passage. Thereby, mixing of the fluid contained in the fluid bearing chamber and the residual air may be reduced or even avoided.

The air supply conduit system for supplying air towards the fluid bearing may comprise one or more air supply pipes at different axial positions and/or at different circumferential positions of the gas turbine. The air supply conduit system may also be referred to as seal air feed. Air from different sources may be supplied to the air supply conduit system. For example, air bled from a compressor of the turbine or air generated by an external compressor may be supplied to the air supply conduit system. Using one or more valves air from these different sources may also be mixed or combined to achieve a desired pressure, temperature, volume per time and/or mass per time to be supplied to the air supply pipe system, in particular depending on a running condition of the turbine.

The air supplied towards the fluid bearing using the air supply conduit system may function to prevent the fluid from escaping from the bearing or at least for preventing the fluid from entering other parts of the turbine, such as a compressor exit, where the compressor exits high temperature, high pressure air to be mixed with fuel and to be burned in a combustor of the turbine. Introduction of fluid, in particular oil, into the compressor exit passage would result to problems, such as carbonization and contamination resulting in a reduced durability and/or efficiency of the turbine.

Under normal operation conditions additionally high pressure high temperature air bled from the compressor exit may be supplied towards the fluid bearing to prevent the fluid from escaping the fluid bearing chamber.

According to an embodiment an outlet of the air supply conduit system for supplying air towards the annular gap is axially arranged closer to the fluid bearing than the inlet of the discharge conduit. Thereby, the outlet of the air supply conduit system may be located axially between the bearing chamber of the fluid bearing and the inlet of the discharge conduit. Thereby, the desired buffering effect may be achieved.

According to an embodiment the gas turbine further comprises a control system (potentially comprises one or more valves within the air supply conduit system and/or within the discharge conduit) arranged to change an amount of air discharging through the discharge conduit based on an operating condition of the turbine. Thereby, an efficiency of the gas turbine may even further be improved, in particular by reducing an amount of air supplied to the air supply conduit system (which may be taken from a portion of the compressed air compressed by the compressor portion of the gas turbine).

The control system may be arranged to change an amount of air discharging through the discharge conduit system, wherein the amount may be a rate, such as volume of air per time, mass of air per time or a volume of air or a mass of air discharged within a certain time interval, such as within 1 second, 10 seconds, 1 minute, or 5 minutes. The control system may comprise mechanical components, such as one or more valves, one or more sensing devices for sensing the amount of air discharged through the discharge conduit system, as well as software or hardware control modules for reading measurement values of the sensing devices and for adjusting the one or more valves. Thereby, the sensing devices, in particular its probes, may be arranged at one or more locations within the discharge pipe system. Further, the one or more valves may be located in one or more discharge pipes comprised in the discharge conduit system and in particular in a common discharge pipe leading to an outlet external to the turbine.

The operating condition of the turbine may be characterized by a fuel supply to one or more combustors of the turbine, by a rotational speed of the rotor, by the amount of air exiting the compressor of the turbine and/or a combination of the aforementioned parameters. In particular, the control system may comprise one or more measuring probes to detect the running condition of the turbine. The control system may be adapted to process measured values and adjust one or more valves by activating one or more actuators. In particular, the control system may be adapted to detect a turbine failure and a condition of a rapid shut-down of the turbine, such as a hot shut-down.

According to an embodiment the control system is adapted to reduce the amount of air discharging through the discharge conduit system, if a rotational speed of the rotor is less than a predetermined value. In this case a supply of air bled from the compressor exit may be reduced and also the amount of air bled from an axial position of the turbine compressor further upstream which is supplied to the air supply pipe system may be reduced. Thus, it may be necessary, in order to prevent the fluid from escaping the fluid bearing, to additionally feed air generated by an external compressor to the air supply pipe system for supplying air towards the fluid bearing. At the same time it may not required to discharge excess air supplied towards the fluid bearing using the discharge pipe system. In other cases the amount of air discharging through the discharge pipe system may at least be reduced, in order to reduce the demand of air supplied to the air supply pipe system using an external compressor. Thereby, the efficiency of the overall system may be improved and the costs may be reduced.

Thereby, in the context of the present invention the flow of air branched off the compressor air passage and flowing within the annular gar defines a flow direction from upstream to downstream providing the possibility to define relative axial positions (positions along the rotation axis of the rotor or turbine shaft) of two elements.

According to an embodiment the control system is further adapted to adjust an amount of air supplied through the air supply pipe system towards the fluid bearing and to adjust an amount of the air discharged through the discharge pipe system such that the bearing fluid is prevented from passing through the gap to the turbine compressor exit. Further, the control system may be adapted to minimize a demand on air supplied by an external compressor by shutting off the discharge pipe system or at least reducing a flow rate of air discharging through the discharge pipe system, while at the same time the bearing fluid is prevented from passing through the annular gap to the turbine compressor exit. Thereby, a safety and efficiency of the overall system may be improved.

According to an embodiment the control system comprises a valve arranged in the discharge pipe system. The control system may comprise one or more valves. In particular, the one or more valves may be arranged in the common discharge pipe and/or in the further common discharge pipe and/or in one or more of the discharge pipes of the discharge conduit system. In particular, one valve may be arranged at a point of the common discharge pipe exiting the turbine and one valve may be arranged at a point, where the further common discharge pipe exits the turbine.

According to an embodiment the air supply system comprises two sets of air supply pipes at different axial positions, one of which is arranged spaced apart from the fluid bearing in an axial direction and the other one of which is arranged axially spaced apart from the fluid bearing in a direction opposite to the axial direction. As mentioned above, the air supply pipes may be in communication with the annular gap and with an annular cavity arranged in the stator portion of the turbine radially farther outwards than the annular gap at the corresponding axial position.

According to an embodiment the fluid bearing comprises a fluid bearing chamber and a bearing fluid supply pipe for supplying bearing fluid to the fluid bearing chamber. The bearing fluid may fill a clearance between a bearing face (or rotor portion of the bearing) of the rotor and a bearing face (or stator portion of the bearing) of the turbine stator to allow smooth rotation of the rotor relative to the stator upon lubrication of the bearing faces. Further, the bearing fluid may contribute to carry away heat from the rotor. The bearing fluid may continuously be pumped via the bearing fluid supply pipe into the bearing chamber. The bearing fluid supply pipe may be surrounded by an annular return pipe for returning excess fluid, in particular oil. Bearing fluid may be supplied to the fluid bearing chamber via the bearing fluid supply pipe under normal running conditions as well as during hot shut-down in order to carry away heat, in particular residual heat, from the rotor.

According to an embodiment the fluid bearing chamber is in communication with the annular gap, wherein the annular gap is adapted (in particular regarding its geometry) such that fluid is drained into the fluid bearing chamber (rather than towards a branch off position of the annular gap from the compressor air passage). In particular, during normal operating conditions the rotor rotates relative to the radially inner stator portion. In particular, due to a centrifugal force some fluid adhering at the rotor portion of the fluid bearing (being in communication with the annular gap) may be forced to a position radially farther out such as to be received at the stator portion of material forming the limitation of the annular gap at the stator portion. Since the annular air passage decreases in radius in a first portion and then increases in radius in a second portion along the flow direction of air flowing within the annular air passage the bearing fluid is drained into the fluid bearing chamber instead of being forth away from the bearing chamber. Thereby, due to the particular geometry of the annular gap and the annular air passage the bearing fluid is more efficiently maintained or kept within the bearing chamber. Thereby, an efficiency of the fluid bearing may be improved, in turn improving the efficiency of the gas turbine.

According to an embodiment the annular gap comprises a first section and a second section, wherein the fluid bearing is axially arranged between the first section and the second section. In particular, the first section may be at least approximately represent a mirror structure (a mirror plane being arranged at particular axial position extending perpendicular to the axial direction) compared to the second section. In particular, a portion of the compressed air branched off the compressor air passage may be supplied towards the first section of the annular gap and another portion may be supplied towards the second section of the annular gap. In particular, the portions of the compressed air may flow towards each other in opposite directions each in the direction towards the fluid bearing chamber located between the first section of the annular gap and the second section of the annular gap. Thereby, the fluid bearing chamber may be in communication with the first section as well as with the second section of the annular gap. Further, bearing fluid may be effectively prohibited from entering (or at least flowing to far within) the first section as well as the second section of the annular gap by introducing the air branched off from the compressor air passage through the first section of the annular gap as well as for the second section of the annular gap.

Features (individually or in any combination) disclosed, described or explained with respect to a gas turbine may also be applied to or used for (individually or in any combination) a method for operating a gas turbine.

According to an embodiment a method for operating a gas turbine is provided, wherein the method comprises rotatably supporting a rotor by a fluid bearing, the rotor comprising a rotor portion of the fluid bearing; rotating the rotor relative to a radially outer stator portion and a radially inner stator portion comprising a stator portion of the fluid bearing; guiding compressed air within a compressor air passage extending between the radially outer stator portion and the radially inner stator portion; guiding air from the compressor air passage within an annular air passage formed by a part of an annular gap between the rotor and the radially inner stator portion, wherein along a flow direction of air flowing within the annular air passage a radius of the air passage decreases in a first portion and then increases in a second portion, wherein a discharge conduit discharges the air flown through the second portion of the annular air passage, wherein an inlet of the discharge conduit for introducing the air flown through the second portion of the annular air passage is axially arranged between the second portion of the annular air passage and the fluid bearing.

In particular, the annular gap may comprise a seal to reduce a flow of air branched off from the compressor air passage, in order to improve the efficiency of the gas turbine. In particular, the seal may be provided at a position of the annular air passage having a sufficiently small radius (in particular a smallest radius), in order to improve a sealing property of the seal. In particular, the seal may comprise plural labyrinth seals along the flow direction of the air guided within the annular air passage.

DETAILED DESCRIPTION

Figure 1:
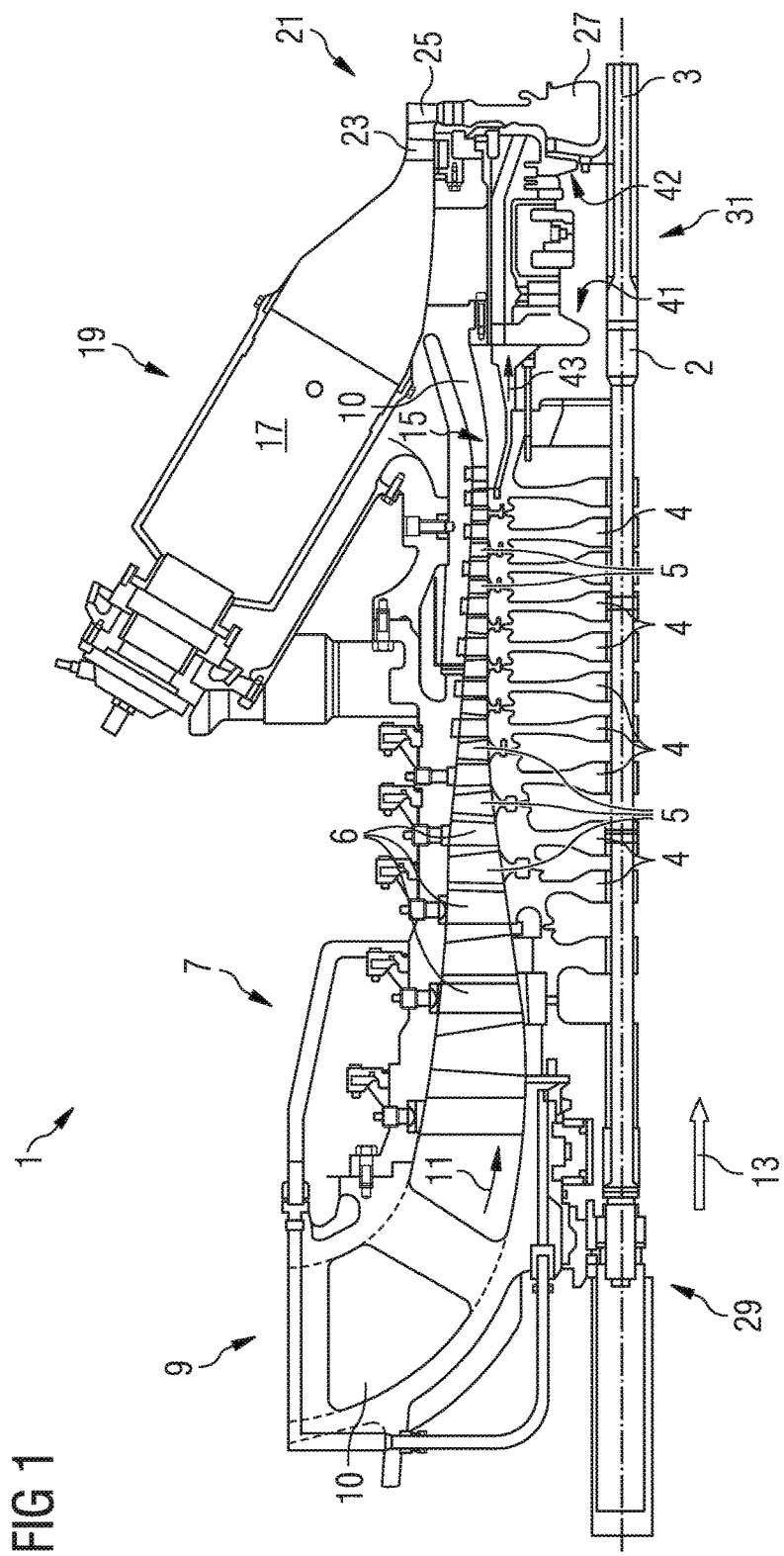
FIG. 1 schematically illustrates a cross-sectional view of a portion of a gas turbine according to an embodiment.

The illustration in the drawing is schematic. It is noted that in different figures, similar or identical elements are provided with the same reference signs or with reference signs, which are different from the corresponding reference signs only within the first digit.

FIG. 1 schematically shows a cross-sectional view of a portion of a gas turbine 1 according to an embodiment. The gas turbine 1 comprises a rotor 2 which can rotate around a rotation axis 3 (running along an axial direction). At the rotor 2 plural rotor blade holders 4 are fixed at which plural rotor blades 5 are clamped in between. In other embodiments the rotor blades do not need to be clamped between two rotor blade holders but to every rotor blade a single holder may correspond to which it is fixed. Upon rotation of the rotor 2 the rotor blades 5 rotate within an compressor air passage 10 of a turbine compressor 7 included in the gas turbine 1. Further, the compressor 7 comprises plural guide vanes 6 that are fixed at a stator part of the turbine 1. Air is introduced into the compressor 7 via a compressor entry 9. Compressed air is supplied to a combustion chamber 17.

Air is introduced into the compressor 7 via a compressor entry 9. The air entered into the compressor 7 flows within the compressor air passage 10 in a direction indicated as arrow 11. The arrow 11 defines a direction from upstream to downstream. The direction of arrow 11 at least approximately corresponds to an axial direction 13 running parallel to the rotation axis 3.

Along its passage through the compressor 7 the air entered at the entry 9 is compressed due to the rotation of the rotor blades 5 and exits the compressor 7 at a compressor exit 15. The compressed air is then supplied into a combustion chamber 17 comprised in a combustor 19. Within the combustion chamber 17 the compressed air is mixed with fuel and burned. The high temperature high pressure burned mixture of fuel and compressed air is then supplied to a turbine portion 21 of the gas turbine 1 which is only partially shown in FIG. 1. The turbine portion 21 comprises plural guide vanes 23 which guide the high temperature, high pressure fluid exiting from the combustion chamber 17 towards plural rotor blades 25 which are connected via rotor blade holders 27 to the rotor 2. Thereby the rotor 2 is driven such that also the rotor blades of the compressor rotate to compress the air.

In order that the rotor 2 can smoothly rotate relative to the stator part 8 (see FIG. 2) of the turbine 1 the rotor 2 is supported by a number of bearings. In the embodiment illustrated in FIG. 1 two fluid bearings are schematically illustrated, wherein the fluid bearing 29 is located approximately at the axial position of the compressor entry 9 and the fluid (oil) bearing 31 (also called compressor turbine exit bearing) is located downstream of the exit 15 of the turbine compressor.

Figure 2:
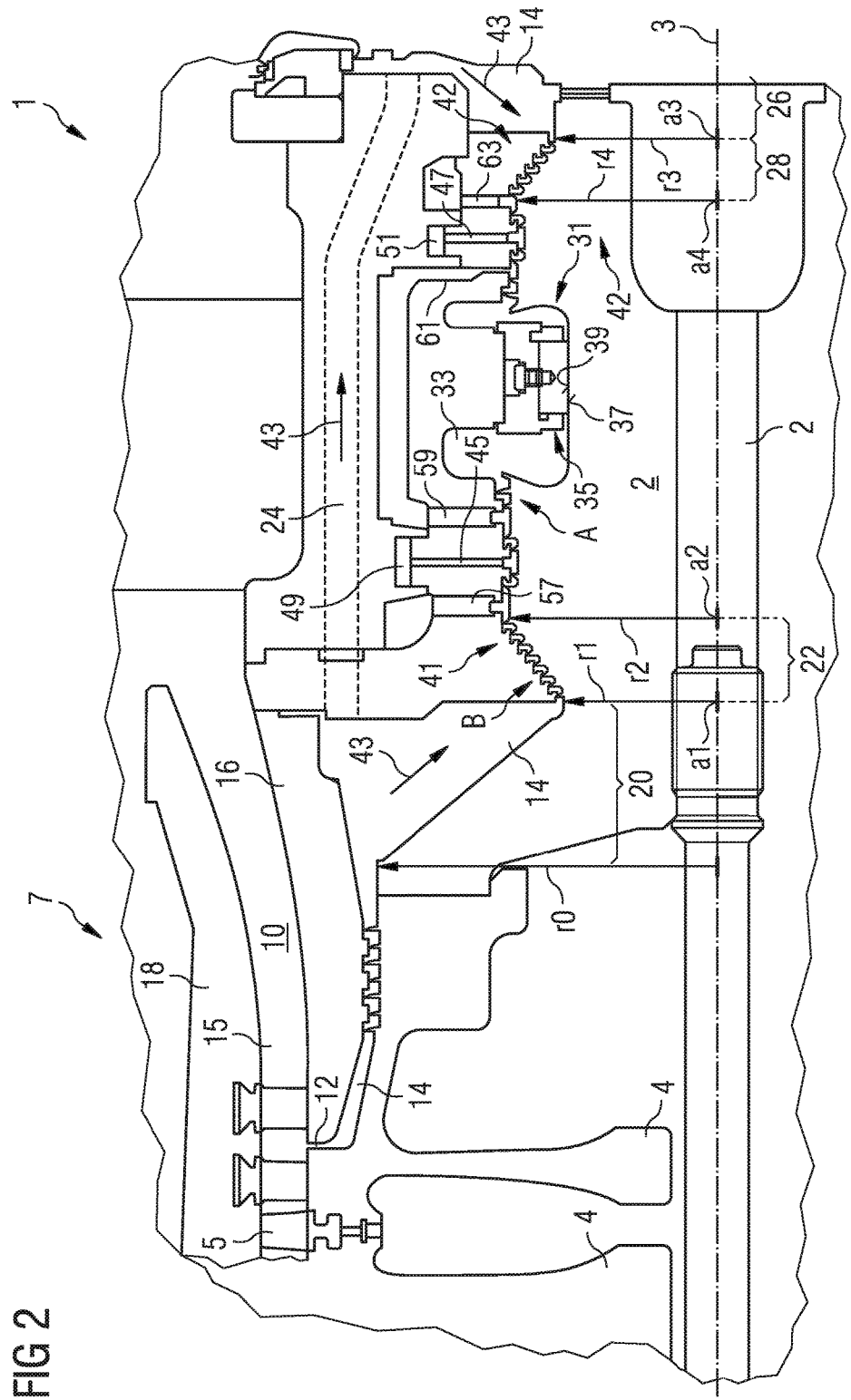
FIG. 2 schematically illustrates a cross-sectional view of the portion of the gas turbine illustrated in FIG. 1.

A portion of FIG. 1 is illustrated in FIG. 2, thereby showing the bearing 31 and an annular air passage 43 in greater detail. The bearing 31 is a fluid bearing, wherein oil is used as a fluid. The bearing 31 comprises a stator portion comprised in the stator portion 8 and a rotor portion comprised in the rotor 2.

Referring to FIG. 2 a part of the compressor air passage 10 is formed or delimited by a radially inner stator portion 16 and a radially outer stator portion 18 of the gas turbine 1. An opening 12 is formed close to the exit 15 of the compressor 7. At the opening 12 an annular gap 14 branches off the compressor air passage 10. The annular gap 14 is formed between the rotor 2 and the radially inner stator portion 16. A portion of the air compressed within the compressor 7 is introduced via the opening 12 into the annular gap 14 thereby forming an annular air passage. This air branched off from the compressor air passage 10 reduces the amount of compressed air within the compressor air passage 10 which could otherwise be used to be led to the combustor 19 in which it could be mixed with fuel and burnt in the combustion chamber 17. Thus, it is desired to reduce the amount of air branching off the compressor air passage 10 via the opening 12.

In order to reduce an amount of air introduced or flowing through the annular gap 14 the annular gap 14 is designed to have a particular geometric shape. Further, plural labyrinth seals 41 are arranged within the annular gap 14 at particular positions. The air introduced via the opening 12 into the annular gap 14 flows along a direction indicated by an arrow 43. As can be seen from FIG. 2, in a first portion 20 of the annular gap 14 the radius (measured from the rotation axis 3) reduces or decreases from a larger value r0 to a smaller value r1. Beyond the axial positional corresponding to the radius r1 the annular gap 14 comprises plural stepped labyrinth seals 41. At the same time, the radius of the annular gap 14 increases from the value r1 to a larger value r2 in a second portion of the annular gap 14 along the flow direction or the air flowing within the annular gap 14. Thereby, an area occupied by the labyrinth seals 41 at the axial positional corresponding to the radius r1 is smaller than an area of the labyrinth seals 41 at the axial position a2 corresponding to the radius r2.

In particular, during operation of the gas turbine 1 a pressure of the air branched off from the compressor air passage 10 and introduced into the annular gap 14 is higher at the axial positional (where the radius amounts to r1) than at the axial position a2 (where the radius amounts to a larger radius r2). Thereby, a sealing property of the labyrinth seals 41 is higher at the axial positional than at the axial position a2, since the area of the seal 41 is smaller in the axial positional than in the axial position a2. Thus, the geometry of the annular gap 14 is designed such that the seal 41 is provided in a region of the annular gap 14, where the area of the annular gap 14 is particularly small compared to other areas of the annular gap 14.

Further, due to the geometry of the annular gap 14 bearing fluid contained within the bearing chamber 33 is effectively drained towards the bearing chamber 33 instead of being drained towards the opening 12 leading in communication with the compressor air passage 10. Thereby, spill of bearing fluid contained within the bearing chamber 33 into the compressor air passage 10 is reduced. The oil contained under pressure within the fluid bearing chamber 33 is utilized to fill a clearance 35 between a bearing face 37 of the rotor 2 and a bearing face 39 of the stator part of the turbine within the fluid bearing chamber 33. The film of oil present within the clearance 35 ensures that the rotor 2 can smoothly rotate relative to the stator part of the turbine 1 upon reduction of friction.

In particular, a reduction of the radius of the annular gap 14 in the first portion 20 is linear when propagating along the axial position and an increase of the radius of the annular gap 14 in the second portion 22 is linear when propagating along the axial position. According to alternative embodiments the decrease of the radius and/or the increase of the radius may be according to another shape or according to another mathematical function such that the sealing property of the labyrinth seals 41 is optimized.

A portion of the air branched off from the compressor air passage 10 is introduced into a transfer tube 24 to be led to further labyrinth seals 42 comprised in the annular gap 14. In particular, the labyrinth seals are arranged along the flow direction 43 of the air such that the seals 42 are arranged at a radius r3. In the first portion 26 of the annular gap 14 the radius decreases to the radius r3 and beyond the corresponding axial position a3 the radius of the stepping seals 42 increases to a radius r4 in a second portion 28 of the annular gap 14. In the first portion 26 and also in the first portion 20 of the annular gap no seal is provided. However a seal is provided in the second portions 22 and 28, respectively.

In the arrangement of the annular gap 14 the highest pressure air branched off from the compressor air passage 10 crosses the first seal fin (at the smallest diameter r1 or r3, respectively,) of the labyrinth seals 41 and 42, respectively.

At certain operating conditions buffer air may not be available or restricted i.e. at shut-down or low speed of a rotation. This may allow oil spray from the bearing chamber 33 to enter the seal system at point A. Any oil that enters at point A will migrate to bottom dead center, but is restricted in flowing towards point B and beyond due to the particular geometry of the annular gap 14. Thereby, operation of the gas turbine 1 may be improved.

The turbine 1 comprises an air supply conduit system 45, 47 for supplying air towards the annular gap 14 and towards the fluid bearing 31. Oil may continuously be supplied to the fluid bearing 31 in order to carry residual heat from the turbine 1 away. This may prevent any thermal damage occurring, however, seal (buffer) air supplied via air supply conduits 45 and 47 may be required, to maintain mass flow over the labyrinth seals 41, 42 and into the bearing chamber 33, thus preventing oil ingress into the seals and discharge conduits 57, 59, 61 and 63.

The air supply pipes arranged at the axial position of air supply conduit 45 are in communication with the annular cavity 49 and the plural air supply pipes at the axial position of the air supply conduit 47 are in communication with the annular cavity 51.

Air introduced into the annular gap 14 (along direction 43) via the plural labyrinth seals 41, 42 is discharged using a discharge pipe system comprising plural discharge conduits 57, 59, 61 and 63, as shown in FIG. 2. In particular, the conduits may be machined holes or slots in the stator. The discharge conduits 57, 59, 61 and 63 are in communication with the annular gap 14 including the seals 41, 42 and extend in a radial direction to discharge the excess air radially outwards. Discharge pipes arranged at the axial positions corresponding to discharge conduits 57 and 63 may lead to a common discharge pipe. In analogy the discharge conduits being arranged at the axial positions corresponding to discharge conduits 59 and 61 may lead to a further common discharge pipe.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The invention claimed is:

1. A gas turbine, comprising:
a rotor comprising a rotor portion of a fluid bearing for rotatably supporting the rotor;
a radially outer stator portion;
a radially inner stator portion comprising a stator portion of the fluid bearing;
a compressor air passage extending between the radially outer stator portion and the radially inner stator portion; and
an annular gap between the rotor and the radially inner stator portion partially forming an annular air passage in communication with the compressor air passage wherein along a flow direction of air flowing within the annular air passage, wherein the flow direction branches off in a direction of the fluid bearing from a downstream direction and an upstream direction relative to an airflow direction in the compressor air passage, a radius of the annular air passage measured from a center of the shaft radially outward decreases linearly so that a fluid flows radially inwardly in a first portion and then increases linearly so that a fluid flows radially outwardly in a second portion towards the fluid bearing, wherein the second portion follows immediate the first portion within the annular air passage; and
a discharge conduit for discharging the air flown through the second portion of the annular air passage is axially arranged between the second portion of the annular air passage and the fluid bearing, wherein an inlet of the discharge conduit for introducing the air flown through the second portion of the annular air passage is axially arranged between the second portion of the annular air passage and the fluid bearing and arranged downstream of the compressor air passage.

2. The turbine according to claim 1, wherein a decrease of the radius of the annular air passage in the first portion is greater than an increase of the radius of the annular air passage in the second portion.

3. The turbine according to claim 1, wherein a smallest radius of the annular air passage ranges between 0.1 and 0.5 of a largest radius of the annular air passage.

4. The turbine according to claim 1, wherein the annular air passage comprises a plurality labyrinth seals at least in the second portion of the annular air passage.

5. The turbine according to claim 1, further comprising:
an air supply conduit system for supplying air towards the annular gap.

6. The turbine according to claim 5, wherein an outlet of the air supply conduit system for supplying air towards the annular gap is axially arranged closer to the fluid bearing than the inlet of the discharge conduit.

7. The turbine according to claim 6, further comprising:
a control system arranged to change an amount of air discharging through the discharge conduit based on an operating condition of the turbine.

8. The turbine according to claim 1, wherein the fluid bearing comprises a fluid bearing chamber and a bearing fluid supply pipe for supplying bearing fluid to the fluid bearing chamber.

9. The turbine according to claim 8,
wherein the fluid bearing chamber is in communication with the annular gap, and
wherein the annular gap is adapted such that fluid is drained into the fluid bearing chamber.

10. The turbine according to claim 1,
wherein the annular gap comprises a first section and a second section, and
wherein the fluid bearing is axially arranged between the first section and the second section.

11. A method for operating a gas turbine, the method comprising:
rotatably supporting a rotor by a fluid bearing, the rotor comprising a rotor portion of the fluid bearing;
rotating the rotor relative to a radially outer stator portion and a radially inner stator portion comprising a stator portion of the fluid bearing;
guiding compressed air within a compressor air passage extending between the radially outer stator portion and the radially inner stator portion; and
guiding air from the compressor air passage within an annular air passage formed by a part of an annular gap between the rotor and the radially inner stator portion,
wherein along a flow direction of air flowing within the annular air passage, wherein the flow direction branches off in a direction of the fluid bearing from a downstream direction and an upstream direction relative to an airflow direction in the compressor air passage, a radius of the annular air passage decreases linearly in a first portion and then increases in a second portion.

* * * * *